US006075209A

United States Patent [19]

Luzzi

[11] Patent Number: 6,075,209

[45] Date of Patent: Jun. 13, 2000

[54] INSULATED CAP FOR LOADBREAK BUSHING

[75] Inventor: Glenn J. Luzzi, Mt. Bethel, Pa.

[73] Assignee: Thomas & Betts International, Sparks, Nev.

[21] Appl. No.: 09/005,867

[22] Filed: Jan. 12, 1998

Related U.S. Application Data

[60] Provisional application No. 60/035,503, Jan. 15, 1997.

[51] Int. Cl.[7] .................... H02G 15/064

[52] U.S. Cl. .................... 174/73.1; 174/74 R; 174/74 A; 174/78; 174/140 R; 174/140 H

[58] Field of Search .................... 174/73.1, 74 R, 174/74 A, 78, 140 R, 140 H

[56] References Cited

U.S. PATENT DOCUMENTS 3,883,208 5/1975 Sankey et al. .................... 439/101
4,202,591 5/1980 Borgstrom .................... 439/185
4,670,625 6/1987 Wood et al. .................... 174/142
4,714,438 12/1987 Williams .................... 439/610
4,855,873 8/1989 Bhargava et al. .................... 361/424

*Primary Examiner*—Kristine Kincaid
*Assistant Examiner*—Mark Olds
*Attorney, Agent, or Firm*—Hoffmann & Baron, LLP

[57] ABSTRACT

An insulating cap for a loadbreak bushing includes an outer conductive jacket preferably having a ground wire receiving member thereon. The ground wire receiving member may be in the form of an integral tab having a bore therethrough for connection of the ground wire. The insulating cap further includes an insulation member positioned in adjacent relationship to the inner surface of the conductive jacket. In a preferred embodiment, both the inner surface of the conductive jacket and the inner exterior surface of the insulation member includes a smooth, dome-shaped region which helps to control electrical stresses, if any. The inner surface of the insulation member defines a bushing receiving space which substantially corresponds to the exterior shape of a loadbreak bushing. When properly grounded, the outer conductive jacket of the insulating cap is maintained at ground potential.

20 Claims, 2 Drawing Sheets

INSULATED CAP FOR LOADBREAK BUSHING

This application claims priority from U.S. Provisional Application Ser. No. 60/035503 filed on Jan. 15, 1997.

BACKGROUND OF THE INVENTION

1. Field of the Invention

The present invention relates to insulated caps and more particularly to insulated caps for high-voltage loadbreak bushings.

2. Description of the Prior Art

Insulating caps for use on high-voltage (15 and 25 KV) transformers and switchgear are well known in the utility industry. Such caps are used to deadfront loadbreak bushing interfaces when energized. A typical prior art high-voltage bushing insulator cap 10 is illustrated in FIG. 1.

Prior art insulating caps generally include a top portion having an eyelet 12. The eyelet 12 is dimensioned for receiving a removal tool, such as a “hot stick” to facilitate removal of the insulating cap from the loadbreak bushing. Accordingly, an operator may remove the insulating cap from a safe working distance.

The insulating cap 10 further includes an outer shield 14 which substantially surrounds the insulating cap. The outer shield 14 is generally formed from a conductive material, such as a conductive rubber, thereby forming a conductive shield for the cap. The outer shield also includes an integral tab 16 having a hole therein for attachment of one end of a ground wire, the ground wire having its other end connected to a system ground. The inner portion of the outer shield 14 has a substantially smooth, rounded dome-like section 19 at a top portion thereof.

The insulating member 18 may be made from any suitable insulation material of high quality having a high dielectric value. The insulating member 18 forms a portion of the insulating cap receiving well 20 dimensioned to fit over a loadbreak bushing. The remainder of the bushing well is formed by a conductive insert 22.

The conductive insert 22 is generally positioned within the dome-shaped portion 19 of the insulating member. The conductive insert 22 has a corresponding smooth, dome-shaped outer surface 23 which is designed to control electrical stresses in the insulating cap. The conductive insert interior surface 24 is shaped to receive the mating bushing exterior. The conductive insert 22 extends to a point below a loadbreak bushing shield housing or “can” (FIG. 2) to shield the bushing assembly. Neither the conductive insert 22 of the insulating cap or the shield housing carries current, but merely provide electrical stress relief.

The insulating cap of the prior art further includes a high potential rod or probe 26 extending through a central axis of the cap. The probe at one extends slightly below a base of the cap and at the opposite end extends into the conductive insert. The probe mates with a current carrying contact assembly 48 (FIG. 2) in the loadbreak bushing 50 (FIG. 2). Accordingly, this high-voltage connection brings system voltage through the probe to the conductive insert, which as previously noted is smoothly shaped to control electrical stresses.

A shortcoming of presently available insulating caps for use with high-voltage loadbreak bushings is that as the insulating cap is removed, system voltage appears “outside” the bushing opening providing an opportunity for a system voltage flashover from the probe to ground. Accordingly, it would be advantageous to provide a high-voltage insulating cap which eliminates the possibility of flashover upon removal from the loadbreak bushing.

OBJECTS AND SUMMARY OF THE INVENTION

It is an object of the present invention to provide an insulating cap for use with loadbreak bushings provided on high voltage transformers and switch gear which deadfront the loadbreak bushing interfaces when energized.

It is a further object of the present invention to provide an insulating cap for a loadbreak bushing which is maintained at ground potential at all times.

It is yet another object of the present invention to provide an insulating cap for a loadbreak bushing which prevents system voltage flashover associated with commonly used caps which include a probe and a conductive insert, the flashover being from either the probe or the conductive insert to ground.

It is still a further object of the invention to provide an insulating cap for a loadbreak bushing which is easier to manufacture having a reduced number of parts and more cost effective.

It is still a further object of the invention to provide an insulating cap which is easily aligned on a loadbreak bushing.

It is yet another object of the present invention to provide an insulating cap for a loadbreak bushing which does not require the high potential probe and conductive insert of prior art insulating caps.

In accordance with the present invention, an insulating cap for a loadbreak bushing includes an outer conductive jacket preferably having a ground wire receiving member extending from the exterior surface thereof and an insulation member positioned within and adjacent to the outer conductive jacket. The insulating member has an interior surface defining a loadbreak bushing receiving space which substantially corresponds to the exterior surface of the loadbreak bushing. In the preferred embodiment, the outer conductive jacket also includes an interior surface having a substantially smooth, dome-shaped upper portion and the insulation member exterior surface conforms to the dome-shaped interior of the conductive jacket. This smooth, dome-shaped portion of the insulation member helps to control electrical stresses which may be formed therein. Furthermore, a properly grounded insulating cap formed in accordance with the present invention is maintained at ground potential at all times. In addition, flashover is prevented upon removal of the insulating cap from energized loadbreak bushings.

The insulating cap of the present invention may include an outer conductive jacket which is formed from a conductive rubber material. Similarly, the insulation member may be made from EPDM rubber.

In order to allow the use of a removal tool, such as a “hot stick”, the insulating cap of the present invention includes an eyelet assembly as part of the top end section thereof.

A preferred form of the insulation cap of the present invention, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
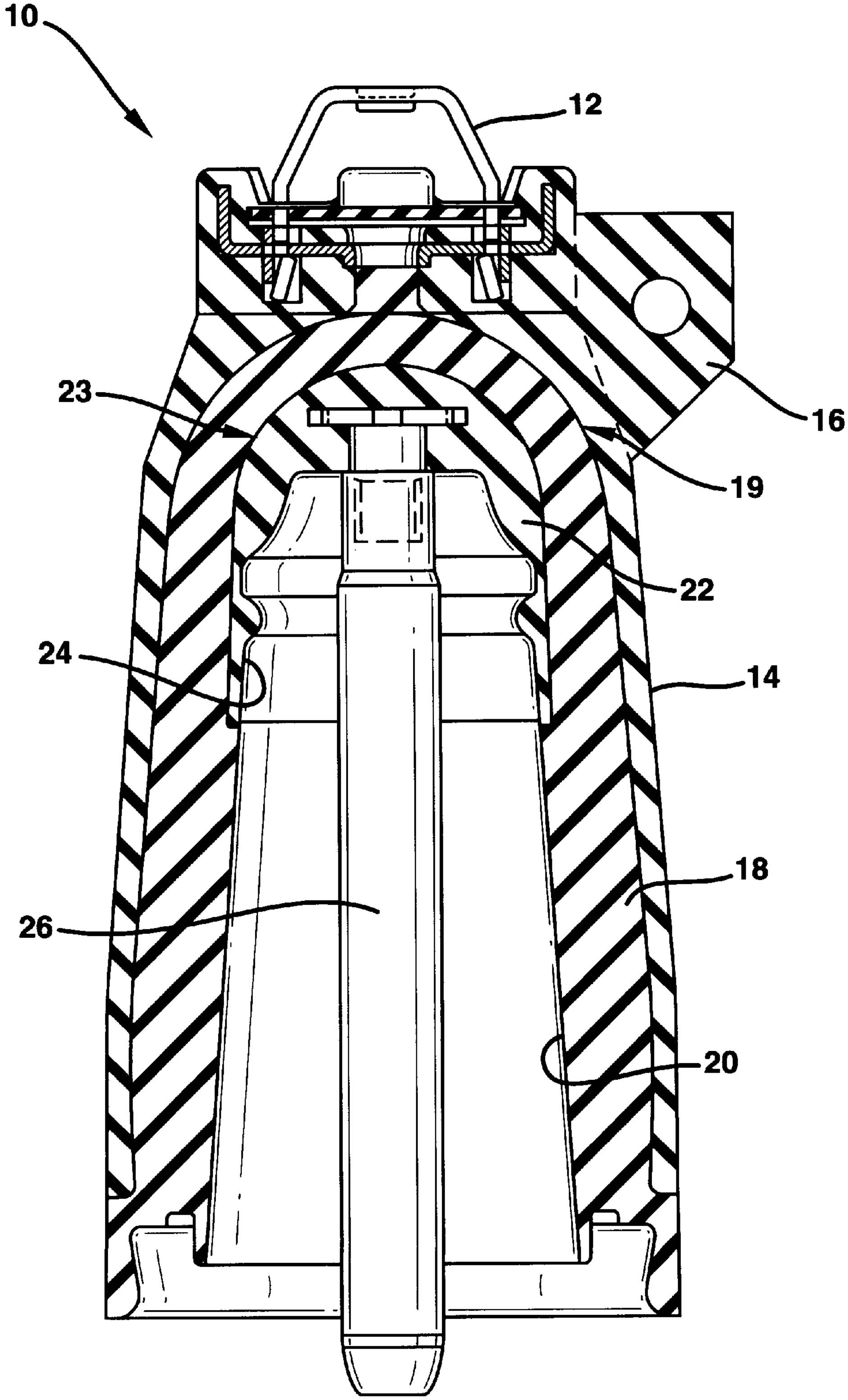
FIG. 1 PRIOR ART
FIG. 1 is a cross-sectional view of a prior art insulating cap for a loadbreak bushing.
Figure 2:
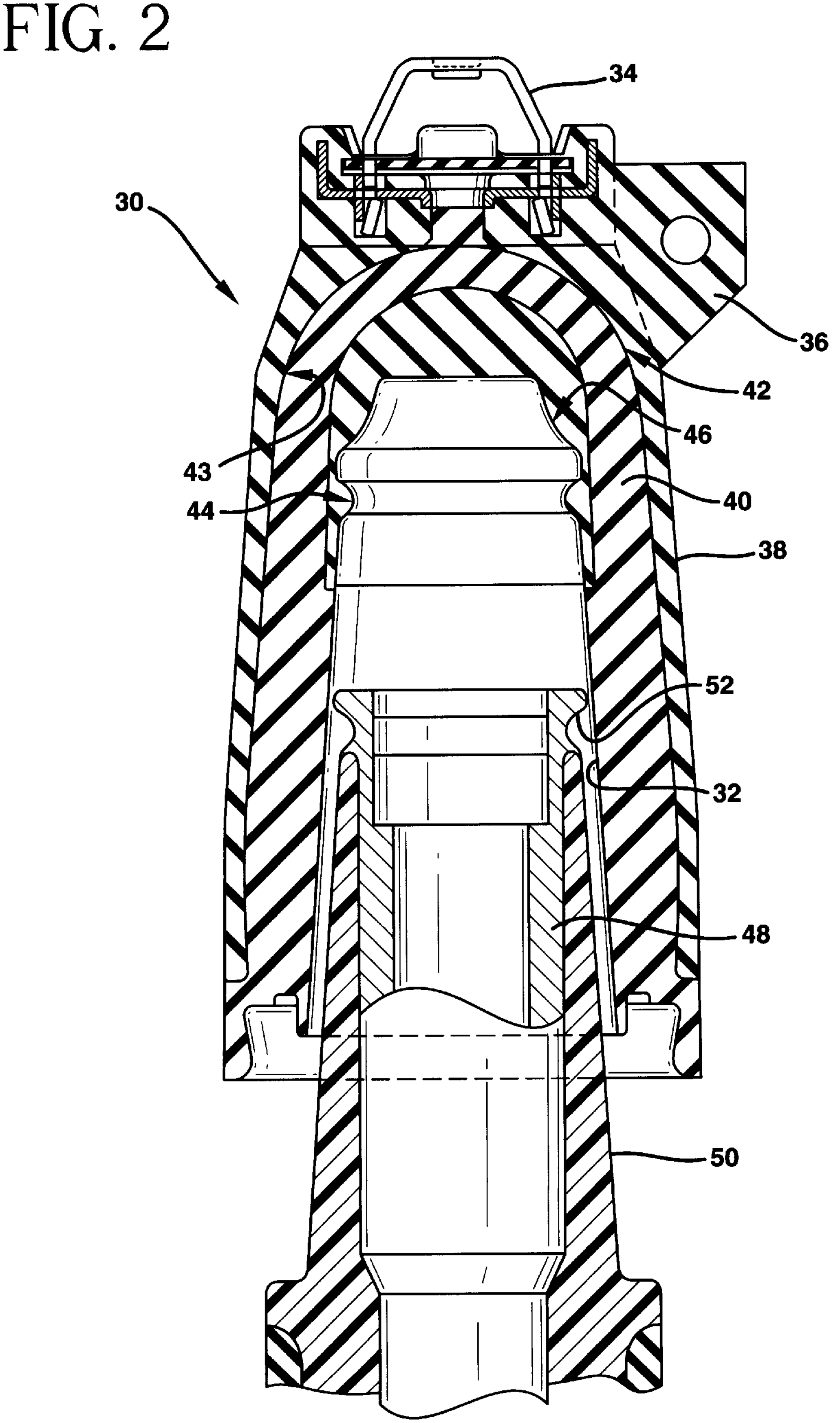
FIG. 2 is a cross-sectional view of an insulating cap formed in accordance with the present invention and corresponding loadbreak bushing.

Referring to FIG. 2, the insulating cap 30 for high-voltage applications of the present invention includes a housing defining a loadbreak bushing receiving space or well 32. The housing includes a top end section having an eyelet assembly 34 dimensioned for receiving a removal tool, such as a "hot stick". The housing may preferably further include a ground wire receiving member in the form of an integral tab 36 having a bore therethrough for connection of a ground wire.

The housing comprises an outer conductive jacket 38 and an insulation member 40 positioned within the conductive jacket. Alternatively, the insulation member 40 may have an exterior surface painted with conductive paint and the outer conductive jacket may be eliminated. The insulation member 40 defines the bushing receiving space 32 of the insulating cap having a shape for matingly engaging an external surface of a loadbreak bushing 50.

The outer conductive jacket 38 is preferably formed of a conductive rubber material. In a preferred embodiment, the inner surface of the conductive jacket includes a top section 42 having a substantially smooth, dome-shaped region. The conductive jacket 38 provides a shield which, in conjunction with a properly assembled ground wire or properly mated to a grounded portion of the loadbreak bushing, makes the insulating cap deadfront, i.e., can be touched without risk of harm. Accordingly, the outer surface of the cap can be maintained at ground potential eliminating risk of harm.

The insulation member 40 is positioned in adjacent relationship to the inner surface of the conductive jacket 38. Accordingly, the insulation member 40 may include an exterior top section 43 having a corresponding smooth, dome-shape similar to the inner surface of the conductive jacket. The smooth, dome-shaped portion of the insulation member helps to control electrical stresses, if any. The insulation member 40 may be made from any suitable insulative material of high quality and having a high dielectric value. Suitable materials include rubber, synthetic rubber, plastic or the like and preferably is made from EPDM (ethylene-propylene-dienemonomer) rubber.

The insulation member 40 also defines the bushing receiving space or well 32 which substantially corresponds to the exterior shape of a loadbreak bushing 50. Specifically, the bushing receiving space 32 includes an opening at the lower end of the cap and substantially smooth walls leading to a teardrop 44 or radially grooved section. The teardrop 44 is dimensioned to closely receive a corresponding teardrop 52 at a top axial end of the loadbreak bushing to thereby lock the cap onto the bushing. Positioned above the teardrop to complete the bushing receiving space is an inverted cup-shaped portion 46.

The insulating cap of the present invention eliminates both the metallic probe 26 and the conductive insert 22 of prior art insulating caps. Accordingly, the present invention is easier to manufacturer as well as being less costly to make in view of the reduced number of parts. Furthermore, the insulating cap of the present invention is easier to install in the field since alignment of the probe is no longer required. The insulating cap is easily placed over the loadbreak bushing for assembly.

The insulating cap of the present invention works better than prior art insulating caps by making the outer surface deadfront and by providing a cap, which upon removal off a live bushing, does not allow system voltage to appear outside the bushing and virtually eliminates the opportunity of a flashover. As discussed in the background of the invention, prior art insulating caps allow system voltage to appear "outside" the bushing and an electrical effect known as "corona" or flashover from either the probe or the conductive insert to ground may occur. Since the insulating cap of the present invention has eliminated the metallic probe and the conductive insert, the opportunity of flashover from these components to ground has also been eliminated. The insulating cap of the present invention does not make contact with any energized portion of the loadbreak bushing.

While a preferred embodiment of the invention has been shown and described, modifications thereof can be made by one skilled in the art without departing from the spirit of the invention.

What is claimed is:

1. An insulating cap for a loadbreak bushing comprising:
   - an outer conductive jacket having an interior surface and an exterior surface, the interior surface having a substantially smooth, dome-shaped upper portion;
   - a ground wire receiving member extending from the exterior surface of the conductive jacket; and
   - an insulation member positioned within the outer conductive jacket, the insulation member having an interior surface defining a loadbreak bushing receiving space dimensioned to receive and lock the cap on the loadbreak bushing, and an exterior surface with a dome-shaped upper portion which conforms to the dome-shaped upper portion of the interior surface of the conductive jacket, the dome-shaped portion of the insulation member controlling electrical stresses formed therein and whereby the outer conductive jacket is maintained at ground potential at all times.

2. An insulating cap defined in claim 1, wherein the outer conductive jacket comprises a conductive rubber material.

3. An insulating cap as defined in claim 1, wherein the ground wire receiving member is an integral tab of said conductive jacket and has a bore therethrough for connection of a ground wire.

4. An insulating cap as defined in claim 1, further comprising an eyelet assembly mounted to a top end section of the conductive jacket for use with a removal tool.

5. An insulating cap as defined in claim 1, wherein the insulation member is made from EPDM rubber.

6. An insulating cap for a loadbreak bushing comprising:
   - an outer conductive material having an exterior surface and an interior surface; and
   - an insulation member positioned in adjacent relationship to the interior surface of the outer conductive material, the insulation member having an interior surface and an exterior surface, the interior surface of the insulation member defining a loadbreak bushing receiving space dimensioned to receive and lock the cap on the loadbreak bushing, whereby the insulation member controls electrical stresses formed therein and the outer conductive material is maintained at ground potential at all times.

7. An insulating cap as defined in claim 6, wherein the interior surface of the outer conductive material includes a substantially smooth, dome-shaped upper portion and said insulation member exterior surface conforms thereto for controlling electrical stresses formed therein.

8. An insulating cap defined in claim 6, wherein the outer conductive material comprises a conductive rubber material.

9. An insulating cap as defined in claim 6, wherein the exterior surface of the conductive material includes a ground wire receiving member, said ground wire receiving member being an integral tab of said conductive material and having a bore therethrough for connection of a ground wire.

10. An insulating cap as defined in claim 6, further comprising an eyelet assembly mounted to a top end section of the conductive material for use with a removal tool.

11. An insulating cap as defined in claim 6, wherein the insulation member is made from EPDM rubber.

12. An insulating cap as defined in claim 6, further including a ground wire receiving member electrically connected to the outer conductive material.

13. An insulating cap as defined in claim 6, wherein the outer conductive material comprises a conductive paint.

14. An insulating cap as defined in claim 6, wherein the outer conductive material comprises conductive rubber.

15. In combination, a high-voltage loadbreak bushing;

an insulating cap dimensioned for being placed over the loadbreak bushing, the insulating cap including an inner insulation member having an exterior surface and an interior surface defining a loadbreak bushing receiving space dimensioned to receive and lock the insulating cap on the loadbreak bushing; and an outer conductive material having an exterior surface and an interior surface which substantially surrounds the exterior surface of the insulation member, whereby the insulation member controls electrical stresses formed therein and the outer conductive material is maintained at ground potential at all times.

16. An insulating cap as defined in claim 15, further including a ground wire receiving member electrically connected to the outer conductive material.

17. An insulating cap as defined in claim 15, wherein the outer conductive material comprises a conductive paint.

18. An insulating cap as defined in claim 15, wherein the outer conductive material comprises conductive rubber.

19. An insulating cap as defined in claim 15, wherein an upper portion of the interior surface of the outer conductive material includes a substantially smooth, dome-shaped section and said insulation member exterior surface conforms thereto for controlling electrical stresses formed therein.

20. An insulating cap as defined in claim 15, wherein the insulation member is made from EPDM rubber.

* * * * *

UNITED STATES PATENT AND TRADEMARK OFFICE
CERTIFICATE OF CORRECTION

PATENT NO. : 6,075,209

DATED : June 13, 2000

INVENTOR(S) : Luzzi, Glenn J.

It is certified that error appears in the above-identified patent and that said Letters Patent are hereby corrected as shown below:

<u>On sheet 2 of 2,</u> please delete Figure 2 and substitute therefore the following Figure 2:

FIG. 2

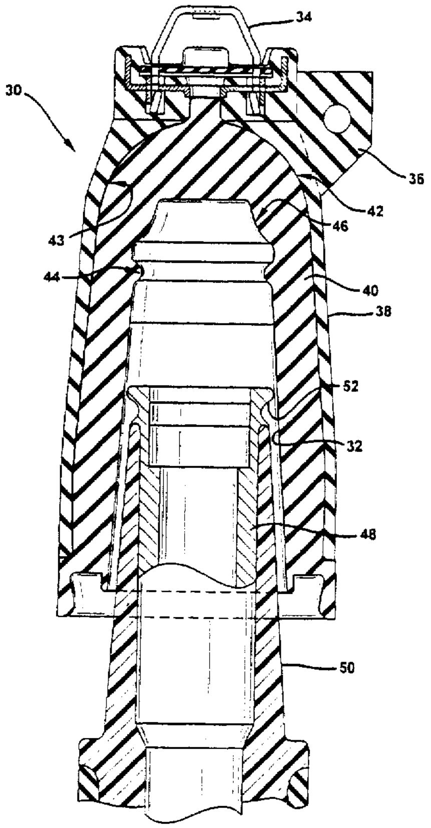

Signed and Sealed this

Twenty-second Day of May, 2001

*Attest:*

NICHOLAS P. GODICI

*Attesting Officer*

*Acting Director of the United States Patent and Trademark Office*